United States Patent [19]

Hagin

[11] 4,283,966
[45] Aug. 18, 1981

[54] OMNIBUS HAVING A FLYWHEEL ENERGY ACCUMULATOR

[75] Inventor: Faust Hagin, Munich, Fed. Rep. of Germany

[73] Assignee: Maschinenfabrik Augsburg-Nurnberg Aktiengesellschaft, Fed. Rep. of Germany

[21] Appl. No.: 846,168

[22] Filed: Oct. 27, 1977

[30] Foreign Application Priority Data

Oct. 29, 1976 [DE] Fed. Rep. of Germany ....... 2649241

[51] Int. Cl.³ .......................... G05G 1/00; B60K 1/00
[52] U.S. Cl. ..................................... 74/572; 180/54 F
[58] Field of Search ................ 74/572; 180/1 R, 54 F

[56] References Cited

U.S. PATENT DOCUMENTS

| 1,993,912 | 3/1935 | Austin | 180/54 F |
|---|---|---|---|
| 2,037,464 | 4/1936 | Flogaus | 180/54 F |
| 2,039,460 | 5/1936 | Smith | 180/1 R |
| 2,185,842 | 1/1940 | Flogaus | 180/54 F |
| 2,232,275 | 2/1941 | Ronning | 180/1 R |
| 2,418,294 | 4/1947 | Flogaus et al. | 180/1 R X |
| 2,435,930 | 2/1948 | Schjolin | 180/54 F |
| 2,569,341 | 9/1951 | Schjolin | 180/54 F |
| 2,688,372 | 9/1954 | Walker | 180/1 R |
| 2,935,899 | 5/1960 | Nallinger | 74/572 X |
| 3,665,788 | 5/1972 | Nyman | 74/572 X |
| 3,882,950 | 5/1975 | Strohlein | 74/572 X |
| 3,910,043 | 10/1975 | Clerk | 180/1 R X |

Primary Examiner—Daniel J. O'Connor
Attorney, Agent, or Firm—Scully, Scott, Murphy & Presser

[57] ABSTRACT

An omnibus including a drive block constituted of an engine, clutch and transmission, in which the drive block is arranged so as to transversely extend behind the rear axle of the omnibus. An angle drive leads from driving end of of the drive block to the center axle drive on the rear axle, and in which a flywheel energy accumulator is installed intermediate the drive block and the rear axle.

2 Claims, 2 Drawing Figures

OMNIBUS HAVING A FLYWHEEL ENERGY ACCUMULATOR

BACKGROUND OF THE INVENTION

1. Field of the Invention

The present invention relates to an omnibus including a drive block or power train constituted of an engine, clutch and transmission, and a flywheel energy accumulator which is coupled with the transmission through the intermediary of a connecting shaft.

2. Discussion of the Prior Art

The advantages of incorporating a flywheel energy accumulator in an omnibus, particularly in a bus of the type which is utilized in line or route service are well known. An essential problem which is encountered in the installation of such flywheel energy accumulators in omnibuses consists of in so arranging the drive block and the flywheel that the transportation or passenger space of the omnibus is not influenced, but on the other hand, the overall length of the bus is not increased due to the utilization of a flywheel energy accumulator. Concurrently, there must be fulfilled the prerequisite that the flywheel energy accumulator is not located too remotely from the drive block and, on the other hand, cannot be located too close thereto since, otherwise, the power transmission from the drive block to the flywheel and, conversely, becomes too cumbersome. In previously known arrangements, the drive block or power train generally lies so as to extend in the longitudinal direction of the vehicle behind the rear axle and the flywheel energy accumulator is located ahead of the rear axle. In view of the foregoing, this requires an inordinate amount of installation space in the omnibus and the distance of the flywheel energy accumulator to the drive block thus becomes relatively large.

SUMMARY OF THE INVENTION

Accordingly, it is an object of the present invention to provide an arrangement for a flywheel energy accumulator and a drive block in an omnibus which affords the greatest possible space savings.

In order to attain the foregoing object it is inventively proposed that, in a known manner, the drive block is arranged so as to transversely extend behind the rear axle, and wherein an angle drive leads from driving end of the drive block to the center axle drive of the rear axle, and in which the flywheel energy accumulator is installed intermediate the drive block and the rear axle.

The major advantage of this inventive arrangement consists of in that the rear overhang of the omnibus, meaning the overall length from the rear axle to the rear edge of the vehicle can be maintained extremely short which, in practical driving operation, is of advantage. A further advantage of this arrangement may be found in that, in this area of the omnibus, the omnibus floor, in the usual instance, is elevated higher than in the central portion of the omnibus, so that there is hereby present still enough headroom to be able to locate a flywheel energy accumulator without causing the available floor space of the omnibus to become too low.

A further feature of the invention consists of in that the connecting shaft leading to the flywheel energy accumulator is located in generally the same horizontal plane as the angle drive leading to the center axle drive and, in this plane, is only slightly inclined with regard to the angle drive. Predicated on the foregoing, this arrangement of the flywheel energy accumulator is considered to be of particular advantage since the flywheel is hereby located in the space subtended by the angle between the drive block and the drive shaft line extending therefrom towards the center axle drive. In this manner, within the narrow bounds which are available, there is achieved the greatest possible distance between the flywheel and the connecting point thereof to the drive of the drive block or power train, and so as to produce therefrom a relatively large length of the cardan shaft for the flywheel energy accumulator, which is of significance insofar as thereby the cardan angles which occur during actual driving operation can be held small.

BRIEF DESCRIPTION OF THE DRAWING

Reference may now be had to a preferred embodiment of the invention, taken in conjunction with the accompanying drawings in which.

DETAILED DESCRIPTION

Figure 1:
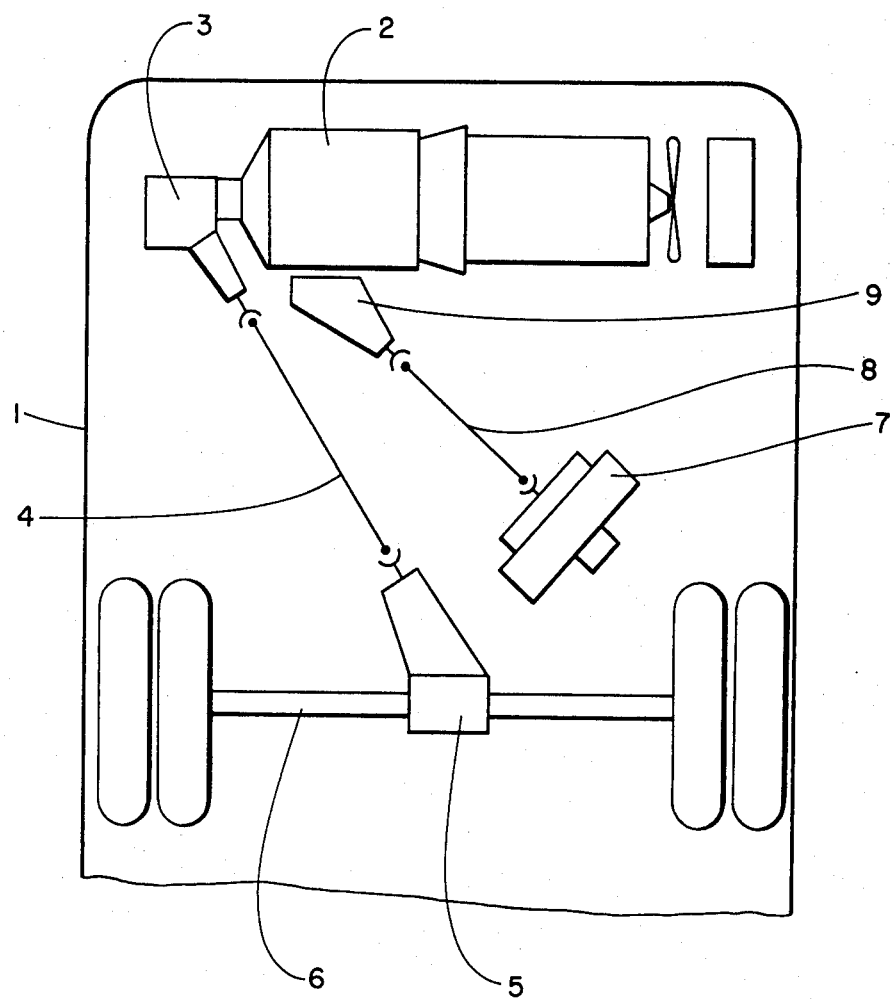
FIG. 1 illustrates a schematic plan view of the rear portion of an inventive omnibus.
Figure 2:
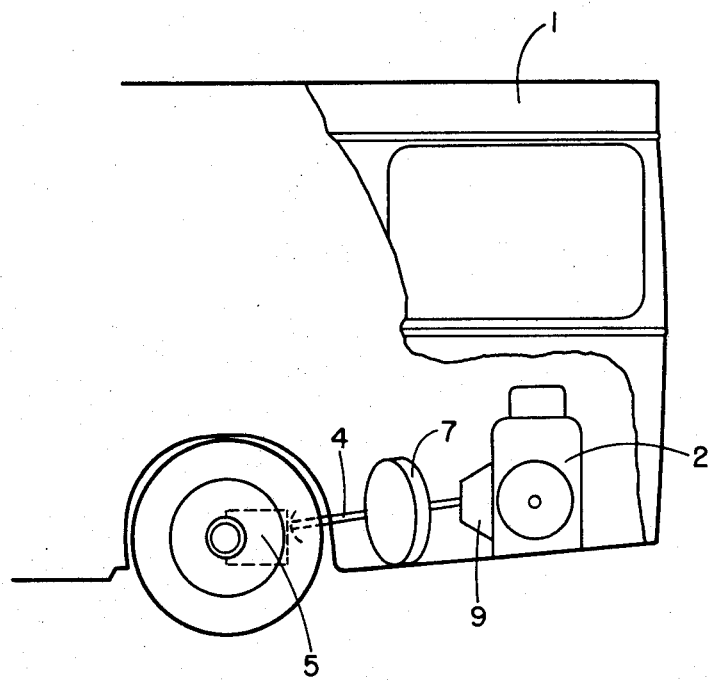
FIG. 2 illustrates a side elevation view of the omnibus according to FIG. 1 wherein the lower part of the body panel is broken away.

In FIG. 1 the body or panel section encompassing the omnibus is designated by reference. numeral 1. Located at one end of a drive block or power train 2, constituted of the engine, clutch and transmission, which is arranged at the rear end of the bus, is an angle drive 3 from which a cardan shaft 4 leads to a center axle drive 5 on the rear axle 6 of the omnibus. In the space subtended by the angle between drive block 2 and the cardan shaft 4 there is located a flywheel energy accumulator 7 which is connected with an auxiliary power take-off 9 from the transmission of the drive block 2 by means of a second cardan shaft 8. As can be seen from FIG. 2 the second cardan shaft 8 is also arranged generally in the same horizontal plane as the angle drive 3 and the cardan shaft 4. The cardan shaft 8 is inclined at a small angle α with respect to the cardan shaft 4 so that there is obtained a maximum spacing for the distance between the flywheel 7 and the transmission of the drive block 2.

What is claimed is:

1. In an omnibus including a drive block constituted of an engine, clutch and transmission; a flywheel energy accumulator; and a connecting shaft coupling said transmission and said flywheel energy accumulator, the improvement comprising: said drive block extending transversely rearwardly of the rear axle of said omnibus; an angle drive including a cardan shaft extending from the driving end of said drive block to a center axle drive on said rear axle, said flywheel energy accumulator being installed intermediate said drive block and said rear axle.

2. An omnibus as claimed in claim 1, said connecting shaft to said flywheel energy accumulator being located in substantially the horizontal plane of said angle drive and the cardan shaft leading to said center axle drive, said connecting shaft being slightly inclined within said plane relative to said cardan shaft.

* * * * *